Jan. 21, 1964   A. I. BEHR   3,118,552
DUAL-PURPOSE TRAILER
Filed July 26, 1961   3 Sheets-Sheet 1

INVENTOR.
ALBERT I. BEHR
BY
Kimmel & Crowell
ATTORNEYS.

Jan. 21, 1964  A. I. BEHR  3,118,552
DUAL-PURPOSE TRAILER
Filed July 26, 1961  3 Sheets-Sheet 2

INVENTOR.
ALBERT I. BEHR
BY
Kimmel & Crowell
ATTORNEYS.

Jan. 21, 1964 A. I. BEHR 3,118,552
DUAL-PURPOSE TRAILER
Filed July 26, 1961 3 Sheets-Sheet 3
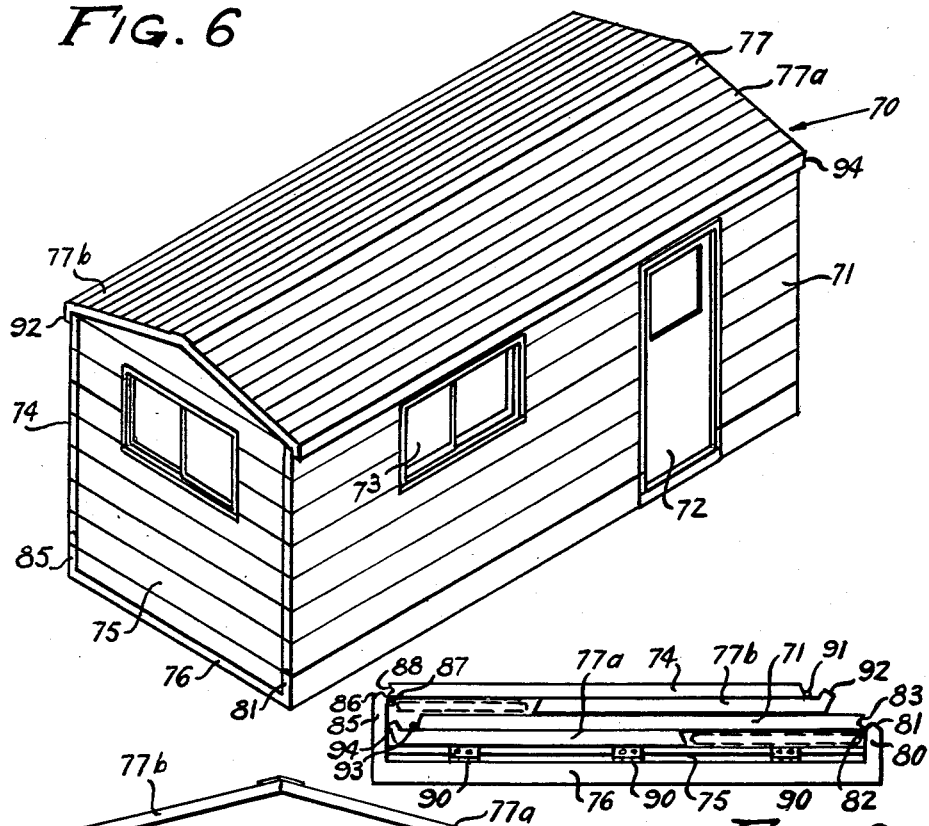
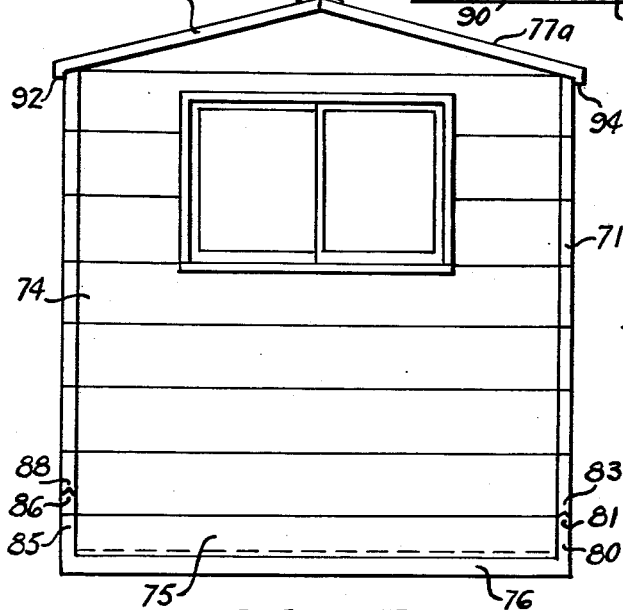
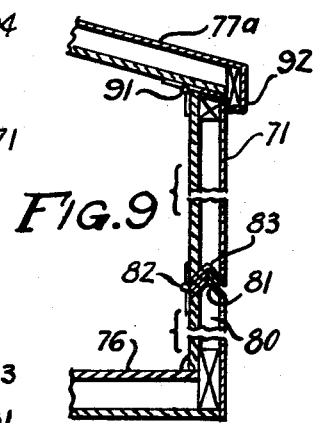
INVENTOR.
ALBERT I. BEHR
BY Kimmel & Crowell
ATTORNEYS.

United States Patent Office 3,118,552
Patented Jan. 21, 1964

3,118,552
DUAL-PURPOSE TRAILER
Albert I. Behr, Rte. 3, Sidney, Ohio
Filed July 26, 1961, Ser. No. 127,010
2 Claims. (Cl. 214—500)

This invention relates to a dual-purpose trailer and more particularly to a trailer which carries a collapsible house, and which, when the house is in collapsed position, may also carry a boat.

A primary object of the invention is the provision of an improved trailer of this character which is provided with a house or cabin mounted thereon, the house or cabin being foldable to a flat condition when not in use, and serving as a base for the support of a boat which may be carried on top of the folded structure.

A further object of the invention is the provision of a device of this character which is particularly adapted for the use of hunters, fishermen or sportsmen, and which will provide not only living accommodations, but which may also serve as a ready means to transport a boat, thus providing in a single unitary structure housing during the trip, and transportation for a boat to a desired locality.

A further object of the invention is the provision of a house which is characterized by extreme simplicity in folding and unfolding, and which occupies a relatively small flat space when in folded condition.

Still another object of the invention is the provision of a device of this character wherein the house may be permanently affixed to the trailer, and the trailer suitably supported and serve as a foundation for the house in the desired locality, or alternatively, wherein under desired circumstances the house may be removed from the trailer, and used for semi-permanent accommodations.

Still another object of the invention is the provision of a house of this character mounted on a trailer which may be folded and unfolded with a minimum of time and difficulty, and which when in unfolded condition is strong and sturdy.

Still other objects of the invention reside in the combinations of elements, arrangements of parts, and features of construction, all as will be more fully pointed out hereinafter and disclosed in the accompanying drawing wherein there is shown a preferred embodiment of this inventive concept.

In the drawings:

FIGURE 6 is a perspective view of the house of the instant invention shown as disassociated from the trailer.

FIGURE 7 is an end elevational view on an enlarged scale of the house of FIG. 6.

FIGURE 8 is an end elevational view of the house in folded position; and

FIGURE 9 is an enlarged, fragmentary, vertical, sectional view, partially broken away, showing the wall and roof construction of the house.

Similar reference characters refer to similar parts throughout the several views of the drawing.

Figure 1:
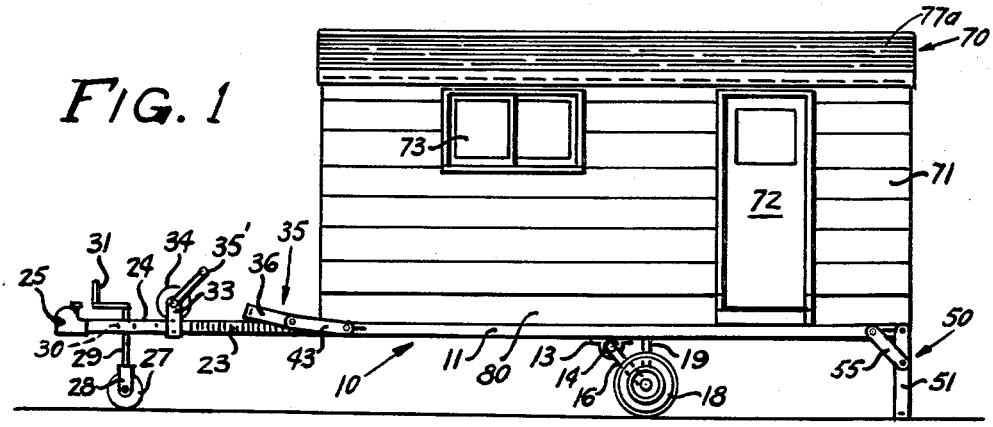
FIGURE 1 is a side elevational view of the trailer of the instant invention showing a house thereon in unfolded position.

Having reference now to the drawings in detail, there is generally indicated at 10 a trailer frame which comprises a pair of longitudinally extending side members 11, which are connected at suitable spaced intervals by transverse members 12. A plate 13 is suspended and securely attached to the frame at an intermediate point, and carries a tubular axle housing 14, which contains an axle 15, to the ends of which are attached wheel support members 16. The wheel support members in turn carry a transverse axle 17 which carries at its opposite extremities rubber tired wheels 18. Suitable shock absorbers 19 are provided and centrally attached as by means of a pivot 20 to the frame (see FIG. 3). The shock absorbers 19 are attached at their other ends as at 21 by means of pivots to lugs 22 carried by the axle 17 to stabilize and equalize the load.

Figure 2:
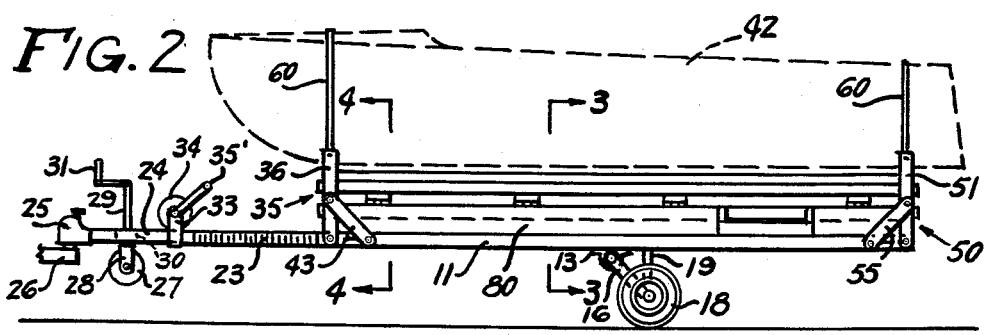
FIGURE 2 is a side elevation of the trailer showing the house in folded position, and indicating in dotted lines a boat carried thereby.

At one end of the frame are a pair of inwardly converging tongue members 23, which terminate in a tongue 24 which carries the usual trailer hitch 25, which is adapted to be secured to a vehicle, a fragment of which is indicated at 26 in FIG. 2. A front wheel 27 is carried by a wheel bracket 28 which in turn is mounted on a threaded shaft 29 which is engaged in a suitable threaded block 30 which is carried by the frame, the shaft 29 being rotated by means of a crank 31 to raise or lower front wheel 27 either from the supporting position of FIG. 1 to the transporting position of FIG. 2.

Winch brackets 33 support a winch 34 which is operable by a crank 35 for the purpose of moving a boat onto and off of the trailer in a manner to be more fully described hereinafter.

Figure 4:
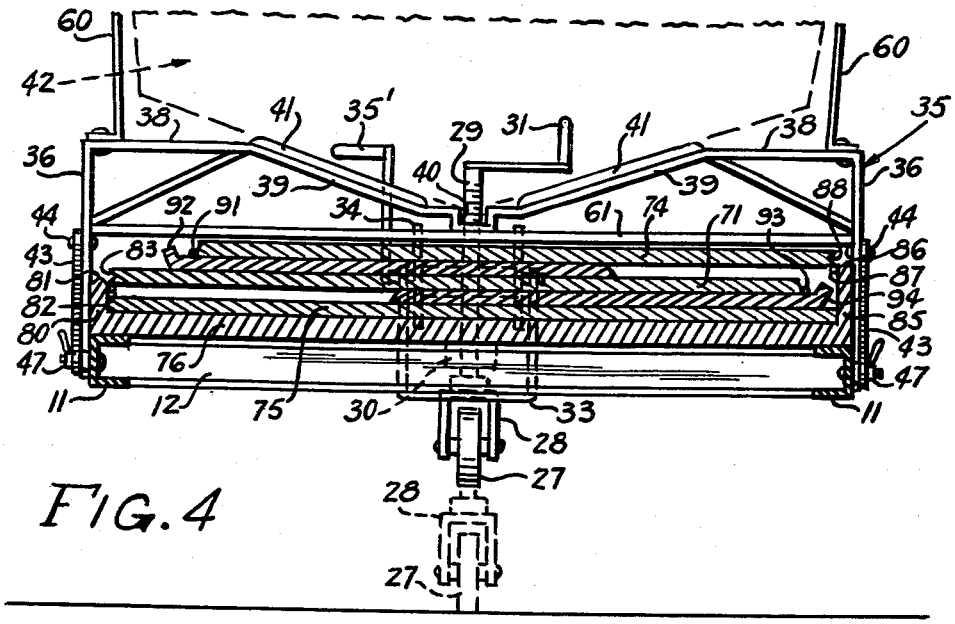
FIGURE 4 is an enlarged sectional view taken substantially along the line 4—4 of FIG. 2 as viewed in the direction indicated by the arrows, certain parts being shown in dotted lines in an alternative position of adjustment.
Figure 5:
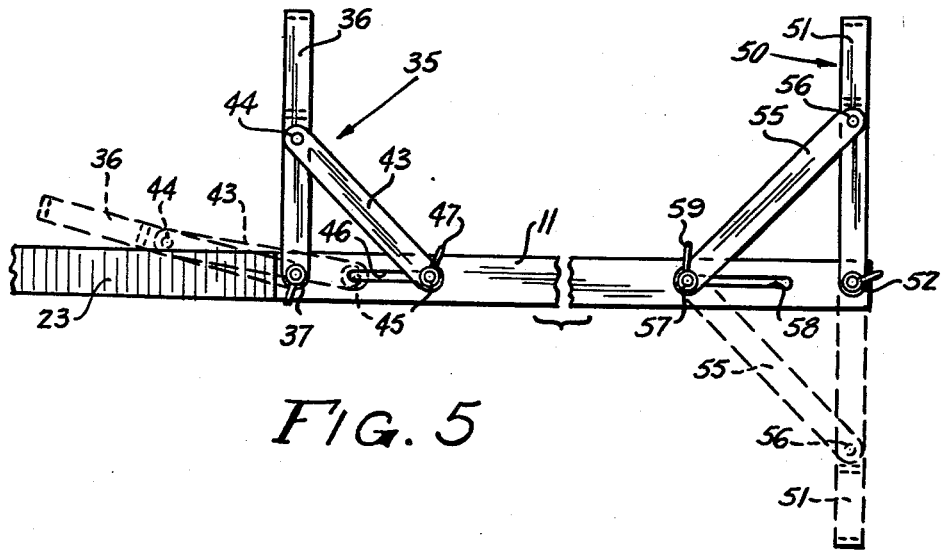
FIGURE 5 is an enlarged detail side elevational view, partially broken away, of the trailer frame showing the supporting members for the boat in two positions of adjustment.

Positioned adjacent to the juncture of the converging members 23 with the front of the longitudinal frame members 11 is a boat supporting bracket generally indicated at 35. The support 35 comprises, as best shown in FIGS. 4 and 5, a pair of vertically extending members 36, which are pivotally mounted as on pivots 37 to the forward end of frame members 11. The members 36 terminate in horizontal supports 38, which converge in angularly inclined members 39 to a central yoke 40. Rubber pads 41 are carried by each of the portions 39 and serve as a front support, when the member is in the position shown in FIG. 5, for a boat generally indicated at 42. When it is desired to unfold the house, in a manner and for a purpose to be described more fully hereinafter, the members 35 are folded to the dotted line position of FIG. 5, or the position shown in FIG. 1. Angularly disposed reinforcing bars 43 are pivotally connected as by means of pivots 44 to intermediate points of the uprights 36, and carry at their other ends pivots 45 which are linearly movable in elongated slots 46, being held in position by wing nuts 47.

Figure 3:
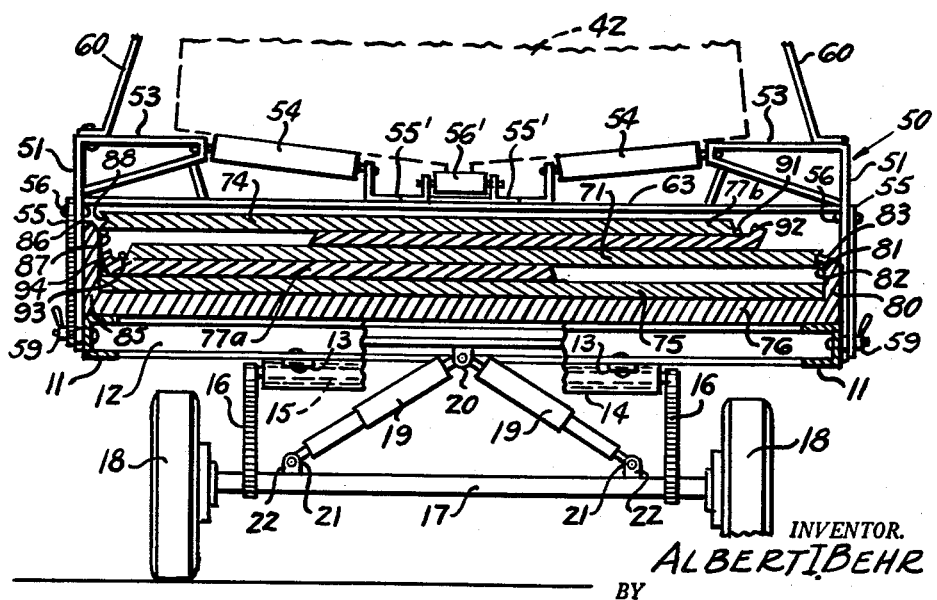
FIGURE 3 is an enlarged sectional view taken substantially along the line 3—3 of FIG. 2 as viewed in the direction indicated by the arrows.

A somewhat similar rear supporting member is generally indicated at 50 and is best shown in FIGS. 3 and 5 and includes uprights 51 which are pivotally mounted as on pivots 52 at the rear end of frame members 11. The members 50 include inwardly extending portions 53, from which extend transverse rollers 54 which are connected to central U-shaped brackets 55', the brackets being spaced apart, and carrying between their inner ends an additional roller 56' to facilitate the mounting and dismounting of the boat 42. Supporting members 55 extend angularly from pivots 56 on upright members 51 to pivots 57 mounted in elongated slots 58, securement being effected by wing nuts 59. When the device is used to support a boat member 50 it is moved to the position shown in FIG. 2, or in full lines in FIG. 5, and when the trailer house is in use, the rear assembly 50 is moved to the dotted line position of FIG. 5 simply by loosening the wing nut 59 and rotating the members 51 about the pivots 52. In this position it serves as a support for the trailer when taken in conjunction with the front wheel 27. Straps 60 may be suitably secured to the ends of the members 53 for holding the boat in position, a similar strap being also secured to the members 38 at the forward end of the boat.

Front boat support 35 includes a transverse member 61 which overlies the house portion of the trailer when in folded position, and rear boat support 50 has a similar transverse member 63 which performs a similar function at the rear of the device.

Referring now to the house in detail, the house is generally indicated at 70, and includes a front wall 71 provided with a door 72 and suitable windows 73, if desired. A rear wall 74 is also provided and may have suitable windows, as may opposite end walls 75. A floor or base 76 serves as a support for the house, and a suitable roof 77 is also provided.

The floor 76 may be conveniently secured to the trailer frame in any desired manner, as by means of releasable bolts (not shown), and is provided along one longitudinal edge with a flange 80 which terminates in a ridge 81. Hinges 82 secure the front wall 71 to the flange 80, the lower portion of the wall being provided with a V-shaped groove 83 which accommodates the ridge 81.

A similar flange 85 of greater height than the flange 80 extends upwardly from the rear of floor 76 and terminates in a ridge 86, the rear wall 74 is hinged by means of a hinge 87 to the top flange 85, and is provided with a V-shaped groove 88 which fits over the ridge 86, as best shown in FIGS. 3 and 4.

The difference in height of the flanges 80 and 85 permits overlapping of the rear wall with the front wall when in folded position. The end walls 75 fold inwardly first from the ends of the floor 76 being secured thereto by means of hinges 90, the height of the end walls relative to the length of the trailer being such that there is no overlapping.

The roof 77 is comprised of two sections 77a and 77b, the section 77b being hinged as by means of hinges 91 to the top of rear wall 74, and being provided with an offset flange 92 which overlies the top edge of the wall. The section 77a is similarly secured by means of hinges 93 to the top of front wall 71 and includes a flange 94 which overlies the top of the front wall 71. The arrangement is thus such that the parts may be folded to the position shown in FIGS. 2, 3, 4, and 8 in relatively flat condition. When the house is in this position the members 50 and 35 are moved to the position shown in FIG. 2 and securely hold the house in folded position as well as provide a support for the boat 42. When the boat is removed and it is desired to use the house, the support 50 is moved to the position shown in FIG. 1 and the support 35 moved to the out-of-the-way position on top of the trailer tongue also as shown in FIG. 1. The rear wall is erected first, the roof folded out, the front wall erected, and its portion of the roof 77a similarly folded out, and the end walls put in position last. Fastening means of any desired conventional type may be employed to hold the parts in related assembly. Obviously, in folding the device the reverse procedure is followed, and when the members 50 and 35 are moved to the upright position a cable extended over the winch drum 34 may be secured to the boat 42 and the same pulled upwarly over the rollers 54 and 56' to rest on the supports 41.

From the foregoing it will now be seen that there is herein provided an improved dual-purpose trailer, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a dual purpose trailer, a wheeled frame, a foldable house comprised of a house floor mounted on said frame, foldable front, rear, and forward and rearward end house sections hingedly mounted on said floor, the width of said front and rear house sections being at least twice the height of said end house sections, roof sections hinged to the top of said front and rear sections, a front boat support pivoted to said frame rearwardly of said forward end house section and adapted to overlie said house when in folded position and a rear boat support pivoted to the rear end of said frame and adapted to overlie said house when in folded position, said rear support being swingable to a position to support the rear end of said frame when said house is unfolded.

2. In a dual purpose trailer, a wheeled frame, a foldable house comprised of a house floor mounted on said frame, foldable front, rear, and forward and rearward end house sections hingedly mounted on said floor the width of said front and rear house sections being at least twice the height of said end house sections, roof sections hinged to the top of said front and rear sections, a front boat support pivoted to said frame rearwardly of said forward end house section and adapted to overlie said house when in folded position and a rear boat support pivoted to the rear end of said frame and adapted to overlie said house when in folded position, said rear support being swingable to a position to support the rear end of said frame when said house is unfolded, said front boat support including rubber boat supporting ports, said rear boat support including rollers, a boat hauling winch drum carried by the forward end of said frame, and an extensible and retractable support for the front end of said trailer.

References Cited in the file of this patent

UNITED STATES PATENTS

| | | |
|---|---|---|
| 2,847,136 | Neff | Aug. 12, 1958 |
| 2,977,010 | Okey | Mar. 28, 1961 |